ously shifted into a Status
United States Patent [19]

Artz et al.

[11] Patent Number: 4,792,894
[45] Date of Patent: Dec. 20, 1988

[54] ARITHMETIC COMPUTATION MODIFIER BASED UPON DATA DEPENDENT OPERATIONS FOR SIMD ARCHITECTURES

[75] Inventors: Ray E. Artz, Apple Valley; Richard J. Martin, Eagan; Vincent E. Splett, Burnsville, all of Minn.

[73] Assignee: Unisys Corporation, Blue Bell, Pa.

[21] Appl. No.: 26,913

[22] Filed: Mar. 17, 1987

[51] Int. Cl.⁴ .......................................... G06F 15/16
[52] U.S. Cl. .................................................. 364/200
[58] Field of Search ... 364/200 MS File, 900 MS File, 364/730

[56] References Cited

U.S. PATENT DOCUMENTS

| | | | |
|---|---|---|---|
| 4,101,960 | 7/1978 | Stokes et al. | 364/200 |
| 4,287,566 | 9/1981 | Culler | 364/200 |
| 4,380,046 | 4/1983 | Frosch et al. | 364/200 |
| 4,435,758 | 3/1984 | Lorie et al. | 364/200 |
| 4,507,728 | 3/1985 | Sakamoto et al. | 364/200 |
| 4,539,635 | 9/1985 | Boddie et al. | 364/200 |

Primary Examiner—Raulfe B. Zache
Assistant Examiner—Ayni Mohamed
Attorney, Agent, or Firm—Glenn W. Bowen

[57] ABSTRACT

Arithmetic Units in an SIMD processor are configurated so that status is computed based upon arithmetic conditions. This status could reflect conditions such as "A greater than B", "A equal to zero", or "overflow". The status implemented in a SIMD processor is dependent upon the specific application of the processor. values of 0 or 1, representing status conditions of true or false are typically latched in a status latch. One of the status latch bits can then be selected through a Multiplexer, (the selecting being done by an instruction from the control unit), and is called the selected condition. This selected condition is serially shifted into a Status Shift Register. The accumulated status bits from several data computations can be built up in the Status Shift Register, where the new selected condition bit is shifted in, and all the original bits in the Status Shift Register are shifted left one place. These accumulated status conditions can then be added to the common address provided to all the Arithmetic Units. This provides the capability to modify memory addresses within the Arithmetic Units based upon data computations, and allows data dependent algorithms to be performed within a SIMD processor without the loss in efficiency found in conditional activate/deactivate schemes, since the Arithmetic Units are always active.

3 Claims, 4 Drawing Sheets

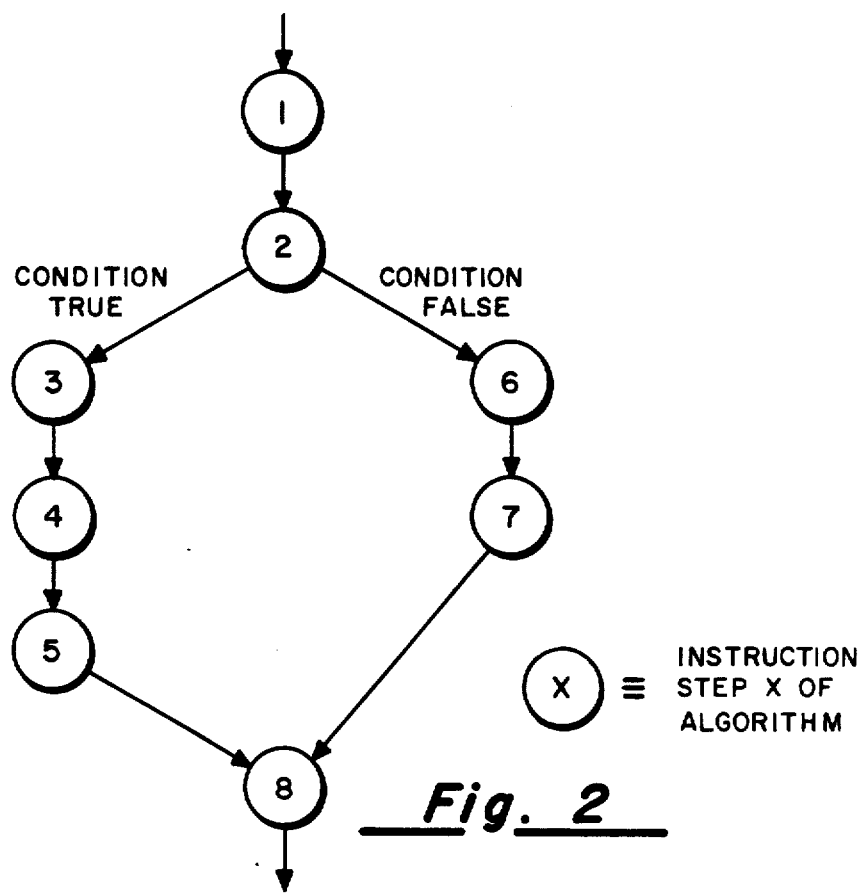
_Fig. 2_
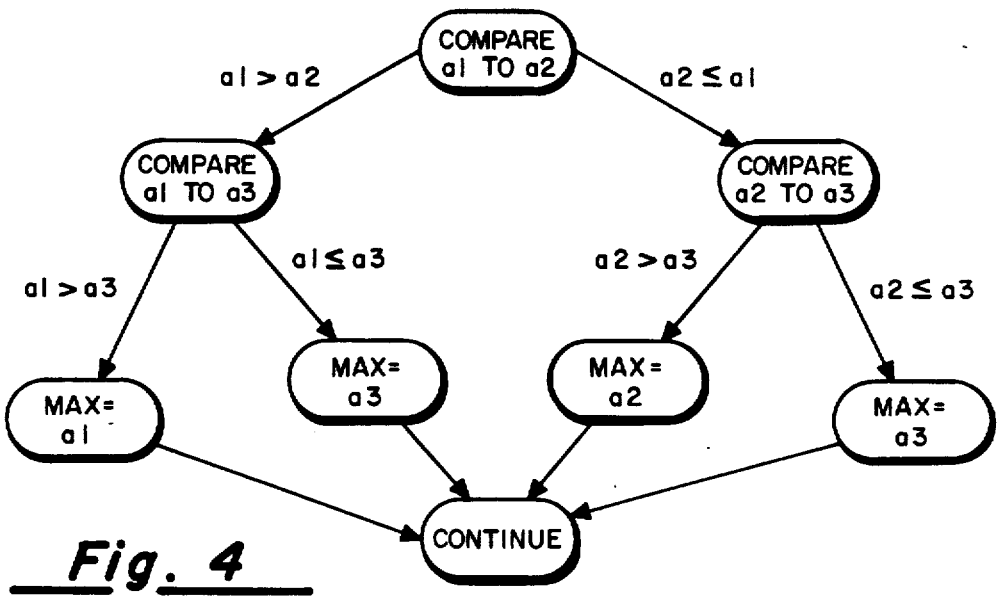
_Fig. 4_

ARITHMETIC COMPUTATION MODIFIER BASED UPON DATA DEPENDENT OPERATIONS FOR SIMD ARCHITECTURES

BACKGROUND OF THE INVENTION

Conventional serial operated computers are derived from the architecture developed by John von Neumann. While this is by far the predominant type of computer, the limitations of this type of architecture for certain applications is leading the computer industry towards investigation of newer, more efficient types of parallel processors. The problem with the von Neumann computer architecture is that data are retrieved from a central memory, operated on and then returned to the memory. For many applications this is a slow and inefficient procedure, since a computer expends a great deal of its time merely retrieving and storing data.

A number of parallel processing architectures have been proposed to overcome the deficiencies of the serial computer. These generally fall under two types of architectures: the single instruction/multiple data (SIMD) stream architecture and the multiple instruction/multiple data (MIMD) stream architecture. A SIMD processor consists of many identical Arithmetic Units executing the same instruction, (but on different data), under the control of a single control unit. A MIMD processor is an asynchronous system where several processors, each executing a different instruction, independently process different data streams. Since the SIMD architecture does not replicate the control unit circuitry in each processor, it tends to be less complex than the MIMD architecture.

In a standard SIMD processor, a single Arithmetic Control Unit provides all the required control information in the form of global instructions to the Arithmetic Units (AU's). These Arithmetic Units, all which are identical, manipulate their own local data (the control and method of getting data to each AU may differ dependent upon the application), based upon the global instructions sent by the Arithmetic Control Unit. Since there is only one Arithmetic Control Unit for all of the Arithmetic Units, every Arithmetic Unit processes its data identically to all the other Arithmetic Units, although the results are different because the data in each AU are different. A standard SIMD processor cannot perform any data dependent algorithms. A data dpendent algorithm is a series of instructions whose instruction flow depends upon data values. This type of algorithm would be handled by using branch instructions in a von Neumann architecture, since there is no way to alter the instruction sequence from the Arithmetic Control Unit when all the possible data conditions in a data dependent algorithm may be present simultaneously in the Arithmetic Units.

FIG. 2 shows pictorially the structure of a data dependent algorithm. At step 2, a branch occurs, base upon the result of a previous instruction. Dependent upon that previously computed condition, either steps 3, 4, and 5 or steps 6 and 7 will be executed before step 8 is performed. Since the data in the memory of each AU can be any value, the standard SIMD processor is unable to perform a data dependent operation; some of the Arithmetic Units may need to traverse the left branch of an algorithm, while others need to traverse the right branch. Since there is only one instruction stream that controls the AU's, it is impossible for a standard SIMD processor to traverse both the left and right branches of an algorithm smmultaneously. The basic SIMD architecture, therefore, cannot perform this algorithm.

The initial conclusion is that SIMD processors are restricted to the class of non-data dependent algorithms, thereby relegating the data dependent algorithms to a processor more suited to performing them. Another option is to add additional functions to the basic SIMD architecture to allow a limited amount of data dependent operations to be performed. One method of adding this capability is by allowing the Arithmetic Control Unit to conditionally activate and deactivate each AU.

Conditional activate/deactivate circuitry in the Arithmetic Units allows them to activate or deactivate themselves based upon a data condition that exists within them. The instruction to conditionally activate or conditionally deactivate comes from the Arithmetic Control Unit, but only in the Arithmetic Units that the specified condition is true will the Arithmetic Unit become active or inactive, respectively. Only the Arithmetic Units that are active will interpret the instructions provided by the Arithmetic Control Unit and act upon them, whereas an inactive Arithmetic Unit will not act upon the instructions provided by the Arithmetic Control Unit (except, of course, it will act upon an instruction to activate itself). The conditional activate/deactivate function gives the capability of traversing, in turn, both branches of the algorithm structure of data dependent operations in a SIMD processor. This is done by serializing the algorithm flow (See FIG. 3) and deactivating the proper Arithmetic Units while traversing first the left side and then the right side of the algorithm structure. Although the conditional activate/deactivate function greatly increases the problem domain in which this modified SIMD processor is applicable, inefficiencies are introduced into the processing since all branch paths of the algorithm must be traversed, forcing Arithmetic Units to be inactive for some period of time, which decreases the overall processing speed of the computer.

In FIG. 3 an 8-step algorithm is illustrated where the activation or deactivation of the arithmetic units (AU) occurs at certain steps. As illustrated, the deactivation of all AU's that have a false condition for the illustrated algorithm will occur at step 2. At step 5 all AU's that had a Mue condition will be deactivated. Then at step 6 all AU's that had a false condition will be activated, and finally at step 7 all AU's will be activated.

SUMMARY OF THE INVENTION

The present invention proposes adding special circuitry to the basic SIMD architecture to provide a system with more efficient data dependent operations than is possible in a system with conditional activate/deactivate circuitry. This invention provides the functionality to overcome the problem in SIMD processors of data dependent control flow modification by allowing data dependent address modification within each Arithmetic Unit. Circuitry, which is replicated in each Arithmetic Unit, allows the conditions of a number of operations to be stored in a shift register; then that condition history value can be added to the memory address provided by the Arithmetic Control Unit.

In the Arithmetic units in the SIMD processor, status is computed based upon arithmetic conditions. This status may reflect conditions such as "A greater than B," "A equal to zero," or "overflow." The status implemented in a SIMD processor is dependent upon the specific application of the processor. Values of 0 or 1, representing status conditions of true or false are typically latched in a status latch. One of the status latch bits can then be selected through a multiplexer (the selecting being done by an instruction from the control unit) and is called the selected condition. This selected condition is serially shifted into the status shift register. The accumulated status bits from several data computations can be built up in the status shift register, where the new selected condition bit is shifted in, and all the original bits in the status shift register are shifted left one place. These accumulated status conditions can then be added to the common address provided to all the arithmetic units. This provides the capability to modify memory addresses within arithmetic units based upon data computations, and allows data dependent algorithms to be performed within a SIMD processor without the loss in efficiency found in conditional activate/deactivate schemes, since the arithmetic units are always active.

To use this invention, the data dependent control flow algorithm usually has to be restructured into an algorithm specified in terms of arithmetic operations using data dependent arithmetic constants or variables. These constants or variables can be selected using the address modification circuitry in conjunction with the data dependent status circuitry, which includes the Status Shift Register.

BRIEF DESCRIPTION OF THE DRAWINGS

The invention is described by reference to the drawings in which:

FIGS. 1a and 1b are a block diagram representation of a single instruction multiple data architecture that may be used to implement the present invention, FIG. 2 is a flow chart of a data dependent algorithm for a von Neumann data processor, FIG. 4 is a flow charge of an algorithm implemented in accordance with the present invention to find the maximum of three numbers.

DESCRIPTION OF THE PREFERRED EMBODIMENT

Figure 1A:
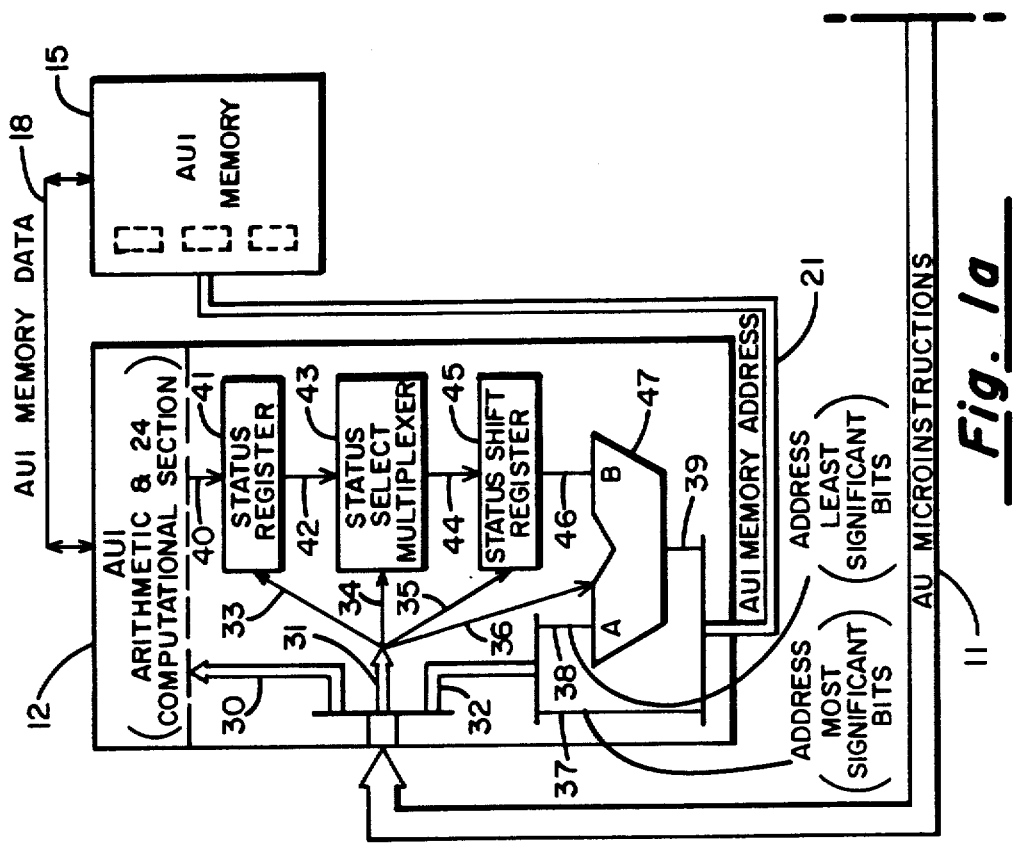
FIGS. 1a and 1b are combined to form a block diagram of the present invention
Figure 1:
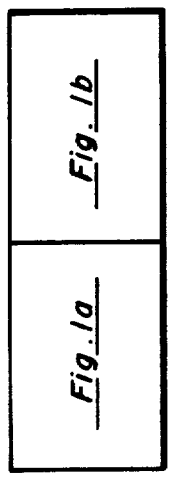
FIG. 1 shows how
Figure 1B:
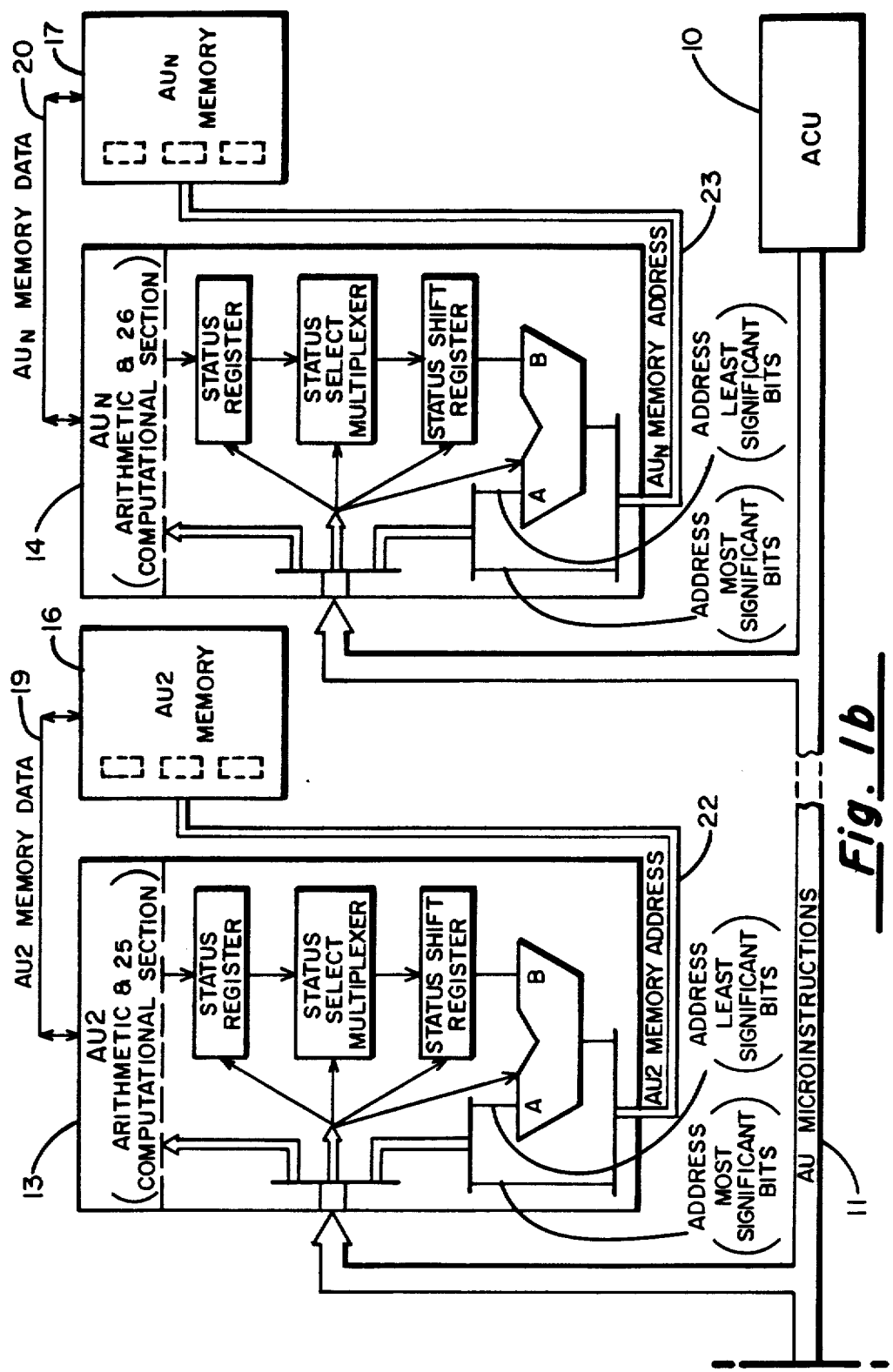

FIGS. 1a and 1b show the overall architecture of a single instruction stream multiple data stream (SIMD) data processing system incorporating the present invention. Arithmetic Control Unit (ACU) 10 is the processor which controls the arithmetic manipulation of the multiple data streams by providing the single instruction to them in the form of the AU MICROINSTRUCTION 11. ARITHMETIC UNITS 1, 2, . . . , N. 12, 13, . . . 14 are the arithmetic processors which perform the actual computations. Each of the ARITHMETIC UNITS performs computations on one of the multiple data streams ARITHMETIC UNIT 12 operates upon data stored within MEMORY 15 and returns resultants to AU 1 MEMORY 15. AU 1 MEMORY 15 is addressed by AU 1 MEMORY ADDRESS 21. Similarly, ARITHMETIC UNIT 2 . . . N 13, . . . , 14 operate upon data stored with AU 2 . . N MEMORY 16, . . . , 17 addressed by AU 2 . . . N MEMORY ADDRESS 22 . . . 23 and return resultants to AU 2 . . . N MEMORY 16, . . . , 17 respectively.

ARITHMETIC UNIT 12, 13, . . . 14 are special purpose processors constructed around the TRW Model TDC-1022 Floating Point Accumulator, and a floating point multiplier. This multiplier and accumulator circuitry are located in the ARITHMETIC & COMPUTATIONAL SECTION 24, 25, . . . 26. AU MEMORY 15, 16 . . . 17 may be implemented using the IDT Corporation Part Number 6167-55, 16K×1 bit static memory. It is apparent, however, that the memory elements may be implemented in a wide variety of ways.

ARITHMETIC CONTROL UNIT 10 broadcasts AU MICROINSTRUCTION 11 to all ARITHMETIC UNITS 12, 13, . . . 14. Each ARITHMETIC UNIT decodes the AU MICROINSTRUCTION received. Part of AU MICROINSTRUCTION 11, AU MICROINSTRUCTION TO ARITHMETIC AND COMPUTATIONAL SECTION 30 is executed by ARITHMETIC AND COMPUTATIONAL SECTION 24. The partitioning of AU MICROINSTRUCTION TO ARITHMETIC AND COMPUTATIONAL SECTION 30 is dependent upon the nature of ARITHMETIC AND COMPUTATIONAL SECTION 24. Since, as state previous, the exact nature of ARITHMETIC AND COMPUTATIONAL SECTION 24 is not relevant to the present invention, the exact portioning of AU MICROINSTRUCTION TO ARITHMETIC AND COMPUTATIONAL SECTION 30 is not relevant to the present invention. Part of AU MICROINSTRUCTION 11, AU MICROINSTRUCTION ADDRESS 32 is the common memory address provided to all ARITHMETIC UNITS. The number of bits in AU MICROINSTRUCTION ADDRESS 32 determines the maximum address space of ARITHMETIC UNITS. The remainder of AU MICROINSTRUCTION 11 is AU MICROINSTRUCTION TO STATUS CIRCUITRY 31, which control the ARITHMETIC UNIT status and address adder circuitry.

The present invention is implemented using STATUS REGISTER 41, STATUS SELECT MULTIPLEXER 43, STATUS SHIFT REGISTER 45, and ADDRESS ADDER 47. STATUS REGISTER 41, STATUS SELECT MULTIPLEXER 43, STATUS SHIFT REGISTER 45, and ADDRESS ADDER 47 are controlled by AU MICROINSTRUCTION TO STATUS REGISTER 33, AU MICROINSTRUCTION TO STATUS SELECT MULTIPLEXER 34, AU MICROINSTRUCTION TO STATUS SHIFT REGISTER 35, and AU MICROINSTRUCTION TO ADDRESS ADDER 36 portion of AU MICROINSTRUCTION TO STATUS CIRCUITRY 31, respectively.

ARITHMETIC UNIT STATUS BITS 40 are inputs to STATUS REGISTER 41, and are loaded into STATUS REGISTER 41 whenever AU MICROINSTRUCTION TO STATUS REGISTER 33 contains a status register load instruction. The exact nature of ARITHMETIC UNIT STATUS BITS 40 depends upon relevant status of ARITHMETIC AND COMPUTATIONAL SECTION 24. Some of these status bits will presumably contain logical and arithmetic comparison information. The output of STATUS REGISTER 41 is LATCHED STATUS BITS 42, which are the value last loaded into STATUS REGISTER 41 by a status register load instruction.

STATUS SELECT MULTIPLEXER 43 selects one of LATCHED STATUS BITS 42 and outputs the selected bit as SELECTED STATUS BIT 44. The bit to select is specified by AU MICROINSTRUCTION TO STATUS SELECT MULTIPLEXER 34.

SELECTED STATUS BIT 44 can be serially shifted into STATUS SHIFT REGISTER 45. AU MICROINSTRUCTION TO STATUS SHIFT REGISTER 35 portion of AU MICROINSTRUCTION TO STATUS CIRCUITRY 31 control the shifting of STATUS SHIFT REGISTER 45. SELECTED STATUS BITS 44 from several operations can be accumulated in STATUS SHIFT REGISTER 45, where the latest SELECTED STATUS BIT 44 is shifted in, and all the original bits in STATUS SHIFT REGISTER are shifted left one place. The value in STATUS SHIFT REGISTER 45 is SHIFTED SELECTED STATUS BITS 46.

AU MICROINSTRUCTION ADDRESS 32 consists of two parts: AU MEMORY ADDRESS MSB'S 37 and AU MEMORY ADDRESS LSB'S 38. ADDRESS ADDER 47 can modify AU MEMORY ADDRESS LSB'S 38 by adding SHIFTED SELECTED STATUS BITS 46 to it to form MODIFIED AU MEMORY ADDRESS LSB'S 39, or ADDRESS ADDER 47 can just pass AU MEMORY ADDRESS LSB'S 38 without modification to MODIFIED AU MEMORY ADDRESS LSB'S 39. AU MEMORY ADDRESS MSB'S 37 and MODIFIED AU MEMORY ADDRESS LSB'S 39 then form AU MEMORY ADDRESS 21.

EXAMPLE OF USE OF THE INVENTION

An example is provided, demonstrating the use of arithmetic computation modifier based upon data dependent operations circuitry. The example chosen is finding the maximum of three numbers. The usual structure of an algorithm to find the maximum of three numbers a1, a2, a3 is shown below:

```
if a1>a2 then
   if a1>a3 then
      max=a1
   else
      max=a3
   endif
else
   if a2<a3 then
      max=a2
   else
      max=a3
   endif
endif
```

Figures 3, 5:
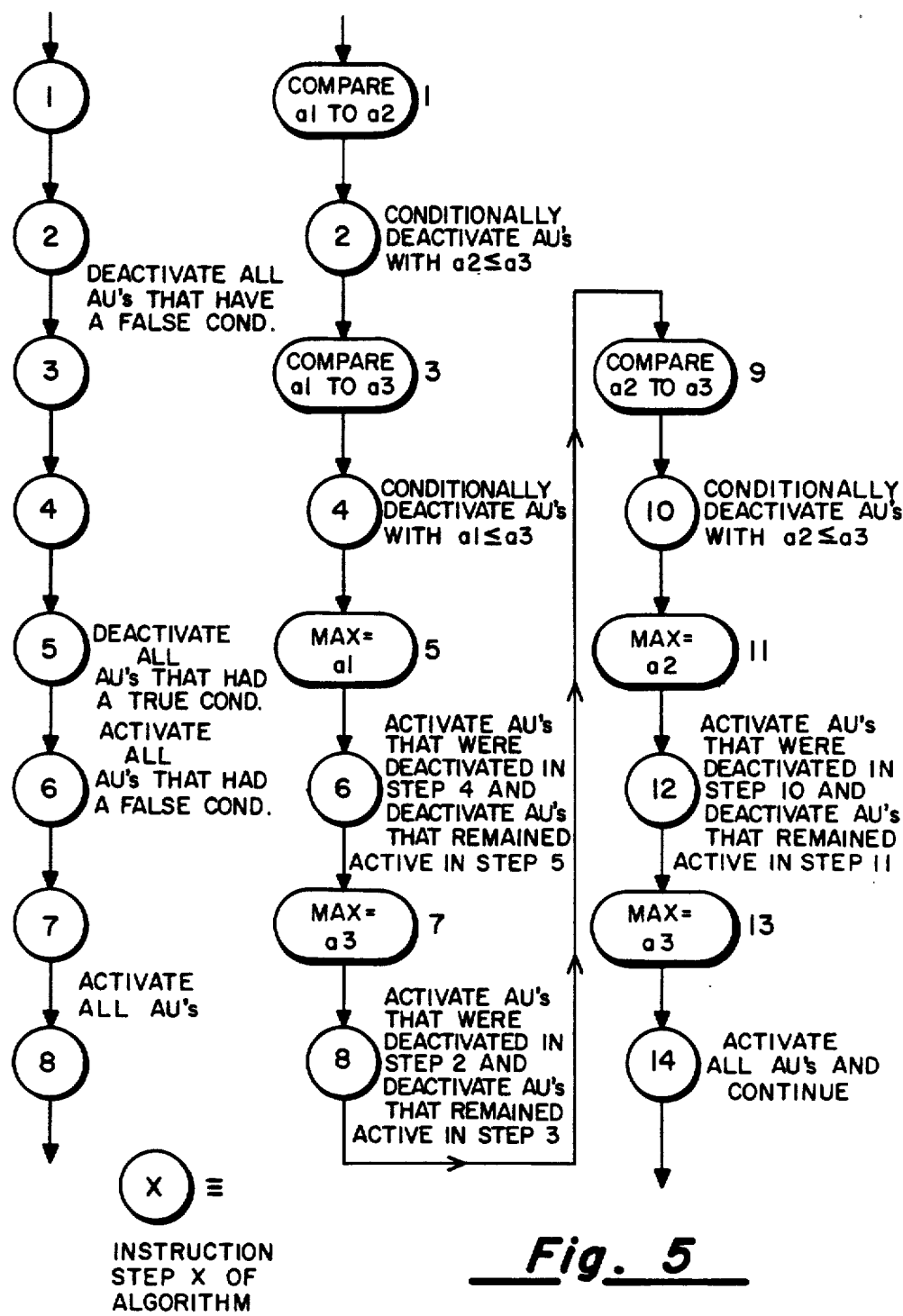
FIG. 3 is a flow chart of a serialized version of the algorithm of FIG. 2 for implementation in a SIMD architecture that supports conditional activate/deactivate operation.
FIG. 5 is a flow chart of a serialized version of the algorithm of FIG. 4 for implementation in a SIMD architecture that supports conditional activate/deactivate operation.

FIG. 4 shows pictorially the tree structure of this algorithm. The algorithm requires many data dependent operations (as characterized by the if-then-else statements), which can be difficult to perform in a SIMD computer. FIG. 5 shows the serialization of FIG. 4 for a conditional activate/deactivate function, and the inefficiencies of that implementation become obvious since the arithmetic units are active only 25% of the time. Restructuring the algorithm to:

$$max = c1*a1 + c2*a2 + c3*a3$$

where $ci=1$ if $ai$ largest 0 otherwise, still implements the maximum function (although it may seem the definition of the ci's are circuitous). This restructuring permits the use this invention, to efficiently compute the maximum, since it is a simple matter to use this invention to determine c1, c2, and c3.

The coefficients c1, c2, and c3 are determined by first performing three comparisons: a1>a2, a2>a3, and a1>a3, and shifting the results of these comparisons into the status shift register as the comparisons are performed. At the end of the three comparisons the status shift register will contain:

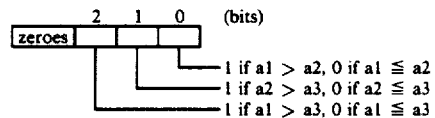

This value in the status shift register then can be used to index into three tables to determine c1, c2, and c3. These tables are set up as follows:

| relative offset | c1 table values | c2 table values | c3 table values |
|---|---|---|---|
| 0 | 0 | 0 | 1 |
| 1 | 0 | 0 | 1 |
| 2 | 0 | 1 | 0 |
| 3 | 0 | 0 | 0 |
| 4 | 0 | 0 | 0 |
| 5 | 1 | 0 | 0 |
| 6 | 0 | 1 | 0 |
| 7 | 1 | 0 | 0 |

For example, if a1>a2>a3 then after the three comparisons, the status shift register will contain 0000 0111 (binary)=7 (decimal); the coefficients are therefore c1=1, c2=0, c3=0, so that:

$$max = 1*a1 + 0*a2 + 0*a3 = a1$$

What is claimed:

1. A single instruction, multiple data processing system for operating on an algorithm that employs a plurality of data dependent constants comprising:
   (a) microinstruction means for supplying microinstructions for implementing said algorithym,
   (b) a plurality of data stream input means,
   (c) a plurality of data processing means each of which is coupled to its own one of said data stream input means and comprises,
      (1) addressable memory means for storing a plurality of predefined table values of said data dependent constants which are accessible for use by its own one of said data processing means after being obtained thereby via addressing of said addressable memory means, and
      (2) addressing means comprising input means and output means for accessing said data dependent constants for use in processing said algorithm, said input means being coupled to a said microinstruction means, to its own one of said data stream input means and to said addressable memory means for addressing a memory address of said addressable memory means as specified by microinstructions from said microinstruction means and the data stream from its own one of said data stream input means, wherein the data stream from its own one of said data stream input means causes a modification of the address that would have been addressed as a function of said microinstructions received by said input means from said microinstruction means in the absence of said data stream, and output means coupled to said addressable memory means for receiving the addressed one of said table values of said data dependent constants from said addressable memory means.

2. A single instruction, multiple data processing system as claimed in claim 1 wherein said addressing means comprising arithmetic means having two sets of inputs, a first set of which is coupled to said microinstruction means, and a second set of which is coupled to said its own one of said data stream input means.

3. A single instruction, multiple data processing system as claimed in claim 2 wherein said addressing means comprises summing means which sums said inputs.

* * * * *

Disclaimer 4,792,894.—*Ray E. Artz*, Apple Valley; *Richard J. Martin*, Eagan; *Vincent E. Splett*, Burnsville, all of Minn. ARITHMETIC COMPUTATION MODIFIER BASED UPON DATA DEPENDENT OPERATIONS FOR SIMD ARCHITECTURES. Patent dated Dec. 20, 1988. Disclaimer filed Feb. 27, 1989, by the assignee Unisys Corp.

Hereby enters this disclaimer to all claims of said patent.

[ *Official Gazette July 25, 1989* ]